C. GOOCH'S
Improvement in
ICE CREAM FREEZERS.

No. 73596

PATENTED JAN 21 1868

Attest.
James Coleman
F. W. Browne

Inventor
Charles Gooch

United States Patent Office.

CHARLES GOOCH, OF CINCINNATI, OHIO.

*Letters Patent No. 73,596, dated January 21, 1868.*

IMPROVED ICE-CREAM FREEZER.

*The Schedule referred to in these Letters Patent and making part of the same.*

TO ALL WHOM IT MAY CONCERN:

Be it known that I, CHARLES GOOCH, of Cincinnati, Hamilton county, State of Ohio, have invented a new and useful Improvement in Ice-Cream Freezers; and I do hereby declare that the following is a full, clear, and exact description thereof, which will enable others skilled in the art to make and use the same, reference being had to the accompanying drawings.

This invention is designed for the class of ice-cream freezers in which the agitator of and the receptacle for the cream revolve in opposite directions, and comprises a combination of spur-wheels for the purpose of giving opposite motions to the beater and receptacle for the cream.

Figure 1:
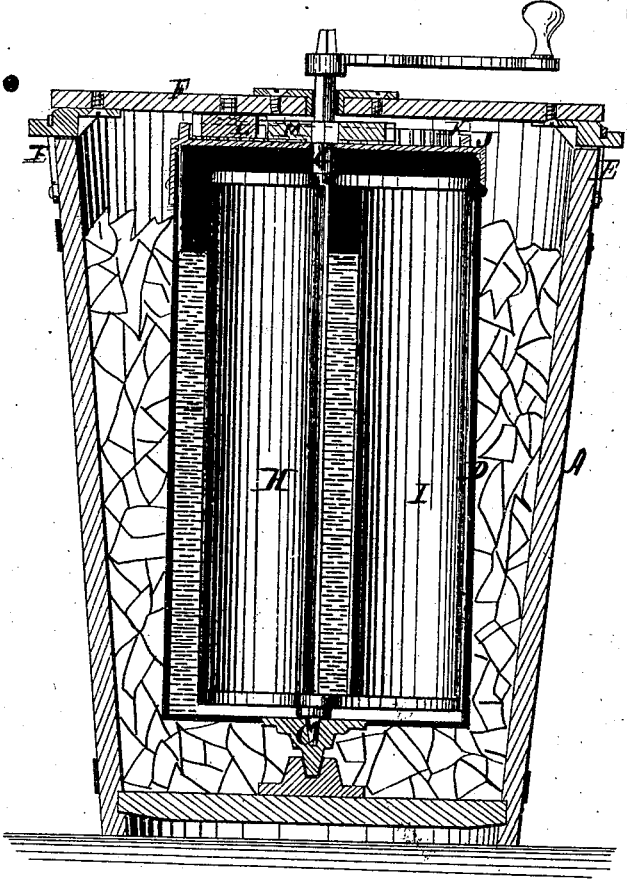
Figure 1 is an axial section of an ice-cream freezer embodying my improvements.
Figure 2:
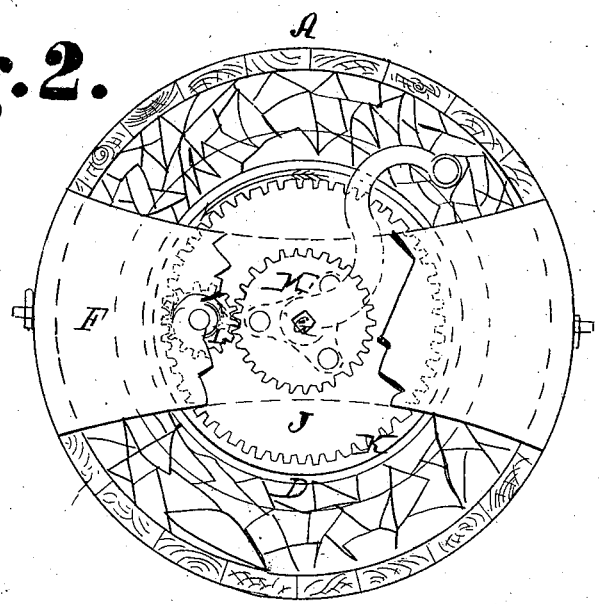
Figure 2 is a horizontal section at the line X X.

A is a tub, in whose bottom is a socket for the pivot C of the cream-can or receptacle D, secured by hooks E E or other device. Athwart the mouth of the tub is a transom, F, perforated at its middle for the stem G of my agitator, H I. The cap J of the can D has attached to it an internal spur-wheel, K, driven by the wheel L, which is attached to the under side of the transom F. The wheel L is driven by the wheel M, which wheel occupies a non-circular portion of the stem G of the agitator, which, on being revolved by a crank on its summit, secures a simultaneous opposing rotation of the can and agitator.

*Claim.*

I claim as new and of my invention—

The internal spur-wheel K, in combination with the wheels L and M, substantially as herein described, for the purpose of securing an opposite motion to the agitator and the can.

In testimony of which, I hereunto set my hand.

CHARLES GOOCH.

Witnesses:
JAMES COLEMAN,
F. W. BROWNE,
JOHN W. CARTER.